A. CHURCHWARD.
POWER TRANSMISSION MEANS FOR OPERATING DYNAMOS.
APPLICATION FILED JAN. 2, 1914.
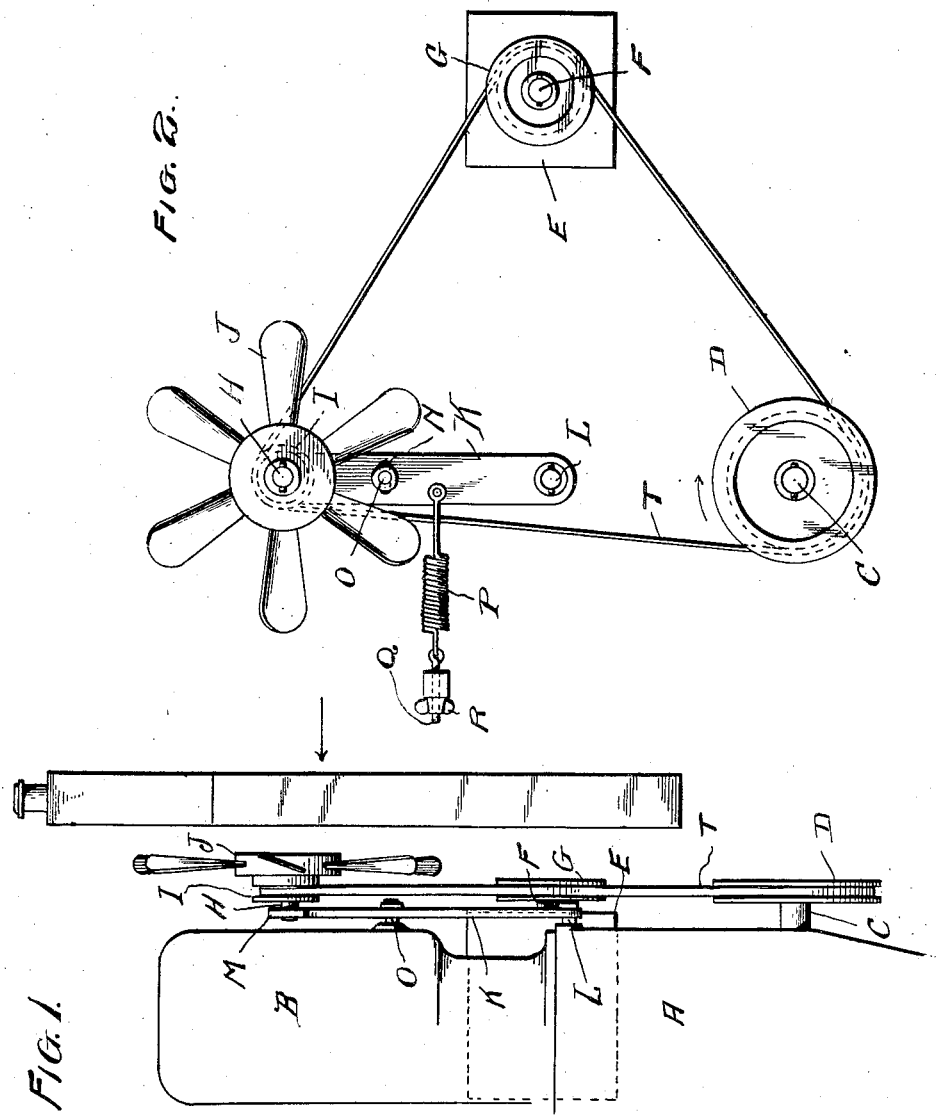

UNITED STATES PATENT OFFICE.

ALEXANDER CHURCHWARD, OF BOSTON, MASSACHUSETTS.

POWER-TRANSMISSION MEANS FOR OPERATING DYNAMOS.

1,153,372.  Specification of Letters Patent.  Patented Sept. 14, 1915.

Application filed January 2, 1914. Serial No. 809,956.

*To all whom it may concern:*

Be it known that I, ALEXANDER CHURCHWARD, a citizen of the United States, residing at Boston, in the county of Suffolk and State of Massachusetts, have invented certain new and useful Improvements in Power-Transmission Means for Operating Dynamos, of which the following is a specification.

The object of my invention is the provision of means for operating a dynamo electric machine at substantially a constant speed by power transmitted from the shaft of an internal combustion or other engine rotating at a variable speed.

The invention consists in connecting a pulley on the armature shaft of a dynamo with a pulley on the rotary shaft of an internal combustion engine by means of a belt and interposing between said pulleys a third pulley which is secured to a shaft having a fan or air propeller, said fan pulley and shaft preferably being movably supported and the pulley frictionally bearing against the belt under spring tension.

It further consists in certain novelties of construction and combinations of parts as herein set forth and claimed.

The accompanying drawing illustrates one embodiment of the invention constructed and arranged according to the best mode of procedure I have so far devised for the purpose, the same being shown in connection with the front end of an automobile.

Figure 1 is a side view in elevation of the front end of an internal combustion engine, such as is used to propel an automobile, a radiator and belt gearing connecting the engine shaft with a dynamo electric machine and a fan blower. Fig. 2 is an elevation view of the engine pulley, dynamo and its pulley and the fan blower, as seen when looking in the direction of the arrow, Fig. 1, the radiator being omitted.

A designates the front end of the crank case of an internal combustion engine; B, a cylinder inclosing a reciprocating piston; C, the crank shaft of the engine; D, a pulley keyed on the shaft; E, a dynamo or electric generator of any type; F, the armature shaft; G, a pulley keyed on the shaft; H, a fan shaft; I, a pulley fixed on the shaft; J, a fan or air propeller fixed on the shaft; K, an arm pivoted at one end to a support L on the engine case and having a bearing M at the free end within which the shaft H is journaled; N, a slotted hole in the pivoted arm; O, a fixed guide pin loosely fitting the slot and seated in the engine case; P, a helical spring secured at one end to the pivoted arm K and adjustably connected by a threaded shank Q and adjusting nut R at the opposite end to an element fixed to or projecting from the engine case; and T is an endless belt of any suitable type frictionally engaging and connecting the engine shaft, dynamo and fan pulleys. The pulley on the power crank shaft turns in the direction indicated by the arrow.

I have found in practice that the interposition of the fan between the crank shaft pulley and the generator shaft pulley causes the belt to slip upon the crank shaft pulley so the armature will rotate at substantially a constant speed under varying speeds of the crank shaft pulley. The power required to drive the fan increases directly as the square of its speed and the increased load thus imposed under the speed variations of the crank shaft pulley occasions the proper slipping of the belt upon the said crank shaft pulley to substantially secure the desired constant speed of the generator shaft pulley and armature.

What I claim is:

1. The combination of a power shaft having a pulley, an electric generator provided with a pulley upon the armature shaft, a shaft, a pulley and a fan carried by said shaft, and a belt connecting the said three pulleys.

2. The combination of a power shaft having a pulley, an electric generator having a pulley, a spring actuated support, a pulley and fan journaled to said spring actuated support, and a belt connecting the said three pulleys.

3. The combination of a rotary power shaft having a pulley, an electric generator having a rotary shaft provided with a pulley, a belt connecting said pulleys, and means for interposing a rotary fan pulley resistance upon the interior surface of the belt between said pulleys.

4. The combination of a rotary power shaft having a pulley, an electric generator having a rotary shaft provided with a pulley, a belt connecting said pulleys, and means for interposing a yielding rotary fan pulley resistance upon the interior surface of the belt between said pulleys.

In testimony whereof I affix my signature in presence of two witnesses.

ALEXANDER CHURCHWARD.

Witnesses:
R. HOYT MOSES,
WILLIAM B. MOSES.